(12) United States Patent
Iinami et al.

(10) Patent No.: US 12,401,521 B2
(45) Date of Patent: Aug. 26, 2025

(54) ELECTRONIC CONTROL UNIT, COMMUNICATION APPARATUS, AND ACCESS ADMINISTRATION SYSTEM

(71) Applicant: SUBARU CORPORATION, Tokyo (JP)

(72) Inventors: Hisataro Iinami, Tokyo (JP); Hironori Ooshima, Tokyo (JP); Takuya Yokohashi, Tokyo (JP); Kenji Kaniwa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 294 days.

(21) Appl. No.: 18/295,383

(22) Filed: Apr. 4, 2023

(65) Prior Publication Data

US 2023/0344645 A1    Oct. 26, 2023

(30) Foreign Application Priority Data

Apr. 20, 2022   (JP) ................................. 2022-069654

(51) Int. Cl.
*H04L 9/32* (2006.01)
*H04L 9/30* (2006.01)
*H04L 9/40* (2022.01)

(52) U.S. Cl.
CPC .............. *H04L 9/3247* (2013.01); *H04L 9/30* (2013.01); *H04L 63/105* (2013.01)

(58) Field of Classification Search
CPC . H04L 9/30; H04L 9/32; H04L 9/3236; H04L 9/3247; H04L 63/10; H04L 63/105
See application file for complete search history.

(56) References Cited

U.S. PATENT DOCUMENTS

| | | | | |
|---|---|---|---|---|
| 2018/0189103 | A1* | 7/2018 | Teshler | ................. G06F 21/572 |
| 2018/0270052 | A1* | 9/2018 | Cullen | ................. H04L 9/0827 |
| 2019/0158297 | A1* | 5/2019 | Yabuuchi | .............. H04W 12/04 |
| 2021/0312564 | A1* | 10/2021 | Katata | ..................... G06F 21/78 |
| 2021/0392496 | A1* | 12/2021 | Vladimerou | .......... H04W 12/06 |
| 2023/0098599 | A1* | 3/2023 | Pal | ........................ H04L 9/3242 717/172 |

FOREIGN PATENT DOCUMENTS

JP         6069039 B2     1/2017

* cited by examiner

*Primary Examiner* — Kostas J Katsikis
(74) *Attorney, Agent, or Firm* — Rimon P.C.

(57) ABSTRACT

An electronic control unit to be applied to a vehicle includes at least one electronic control unit. The at least one electronic control unit is configured to: store a public key; receive a role list to set a specific work permitted to be executed by the at least one electronic control unit from a communication apparatus; perform signature verification of the role list using the public key; set, based on the role list verified by the signature verification, an available work list indicating the specific work permitted to be executed; and execute, when receiving a request message requesting the specific work set in the available work list, a process of the specific work.

11 Claims, 9 Drawing Sheets

| DATA ON APPLICATION FOR USE ||
|---|---|
| ITEM NUMBER | DESCRIPTION |
| 1: USERNAME | AAA CORPORATION, BBB OFFICE |
| 2: COUPLING DEVICE NUMBER | Xxxxxxxx |
| 3: TARGET VEHICLE NUMBER | xxxyyyzzzz |

| ITEM NUMBER | DESCRIPTION |
|---|---|
| 1: USERNAME | AAA CORPORATION, BBB OFFICE |
| 2: ROLE CODE | MARKET |
| 3: COUPLED DEVICE NUMBER | Xxxxxxxx |
| 4: TARGET VEHICLE NUMBER | xxxyyyzzzz |
| 5: EXPIRATION DATE | 2022/03/05  12:00 |
| 6: TRAVELING DISTANCE LIMIT | NULL |
| 7: VEHICLE ACTIVATION LIMIT | 5 |
| 8: WORK INSTRUCTION LIMIT | 10 |

FIG. 5

| | | ROLE CODE | | | | |
|---|---|---|---|---|---|---|
| SPECIFIC WORK | NULL | DEVELOPMENT | MANUFACTURE | MARKET | ANALYSIS | DISPOSAL |
| DID READING/DTC READING | x | x | x | x | x | x |
| MEMORY DESIGNATION READING | | x | | | | |
| MEMORY DESIGNATION WRITING | | x | | | x | |
| ACTIVE TESTING | | x | x | x | x | |
| TOTAL TESTING IN MANUFACTURING | | x | x | | | |
| PROGRAMMING | | x | | | | |
| ⋮ | ⋮ | ⋮ | ⋮ | ⋮ | ⋮ | ⋮ |

ELECTRONIC CONTROL UNIT, COMMUNICATION APPARATUS, AND ACCESS ADMINISTRATION SYSTEM

CROSS-REFERENCE TO RELATED APPLICATIONS

The present application claims priority from Japanese Patent Application No. 2022-069654 filed on Apr. 20, 2022, the entire contents of which are hereby incorporated by reference.

BACKGROUND

The present disclosure relates to an electronic control unit (hereinafter referred to as an ECU), a communication apparatus, and an access administration system each of which prevents unauthorized access to information stored in the ECU mounted on a vehicle.

A recent vehicle includes multiple ECUs including an engine control ECU that controls an engine. Further, a vehicle control apparatus that includes an integrated ECU collectively having respective functions of multiple ECUs has been developed. Some of the ECUs include non-volatile rewritable memories that store control data including data on sensor sensitivity and delay operation times of room lamps, for example. The control data is rewritable even after supply of the vehicle to the market. Further, the ECU stores data on various vehicle states and data on the results of automatic diagnosis. These pieces of data are used by a manufacturer for development and improvement purposes, and are used also by a dealer to perform vehicle maintenance, such as malfunction diagnosis or control data adjustment. To read these pieces of data, a dealer couples a dedicated inspection and maintenance device such as a tablet to the ECU of the vehicle. Reference is made to Japanese Patent No. 6069039.

SUMMARY

An aspect of the disclosure provides an electronic control unit to be applied to a vehicle. The electronic control unit includes at least one electronic control unit. The at least one electronic control unit is configured to: store a public key; receive a role list to set a specific work permitted to be executed by the at least one electronic control unit from a communication apparatus; perform signature verification of the role list using the public key; set, based on the role list verified by the signature verification, an available work list indicating the specific work permitted to be executed; and execute, when receiving a request message requesting the specific work set in the available work list, a process of the specific work.

An aspect of the disclosure provides a communication apparatus configured to: create data on an application for use in which user information and target vehicle information are associated with each other; send the data on the application for use to an administration server; and send a received role list to at least one electronic control unit configured to set, based on the role list verified by signature verification using a public key, an available work list indicating a specific work permitted to be executed.

An aspect of the disclosure provides an access administration system configured to control access to at least one electronic control unit mounted on a vehicle. The access administration system includes: an administration server configured to store a secret key; the at least one electronic control unit configured to store a public key; and a communication apparatus configured to be coupled to the administration server and the at least one electronic control unit. The administration server is configured to: create a role list to set a specific work permitted to be executed by the at least one electronic control unit; and sign the role list using the secret key. The communication apparatus is configured to send the role list received from the administration server to the at least one electronic control unit. The at least one electronic control unit is configured to: receive the role list signed by the administration server from the communication apparatus; perform signature verification of the role list using the public key; set, based on the role list verified by the signature verification, an available work list indicating the specific work permitted to be executed; and execute, when receiving a request message requesting the specific work set in the available work list, a process of the specific work.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Vehicle malfunction diagnosis generally involves United Diagnostic Services (UDS), which is a malfunction diagnostic communication protocol. A dealer who manages vehicle maintenance establishes the malfunction diagnostic communication by coupling a dedicated vehicle maintenance apparatus, such as a tablet, to a vehicle. Existing diagnostic functions with high anti-theft security and high confidentiality are made available using security access. Key information used for this security access is stored in malfunction diagnosis software of the vehicle maintenance apparatus. When the vehicle maintenance apparatus is coupled to the vehicle, diagnostic information is acquired from an ECU in the vehicle using the key information, for example. The key information can be stolen by analyzing the vehicle maintenance apparatus or the malfunction diagnosis software, leading to creation of unauthorized tools. Thus, access of the vehicle maintenance apparatus to the ECU has to be strictly controlled.

One conceivable method of preventing the leakage of the key information involves storing the key information in an administration server instead of the vehicle maintenance apparatus. However, this method involves coupling the vehicle to a network in the process of the malfunction diagnosis, and is thus susceptible to the influence of a ready status of the network environment.

Another conceivable method of preventing the leakage of the key information involves storing access privileges set for respective operators in the ECU without using the key information, as disclosed in Japanese Patent No. 6069039. However, this method involves storing access information on all possible operators in the ECU of the vehicle. This increases the amount of information to be stored in the ECU. Further, although the method is supposed to be employed also when the vehicle is offline, a new operator is not given an access privilege unless the access information stored in the ECU is updated.

Meanwhile, right to repair (R2R) laws are being enacted in the states of the United States of America and European countries. According to the R2R laws, vehicle diagnosis information necessary for vehicle malfunction diagnosis should be made available to a person, such as an owner of the vehicle, other than the dealer. This raises concerns about difficulties in controlling the access to the ECU.

It is desirable to provide an electronic control unit, a communication apparatus, and an access administration system each of which makes it possible to execute a specific work within a range appropriate for each operator.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

Figure 1:
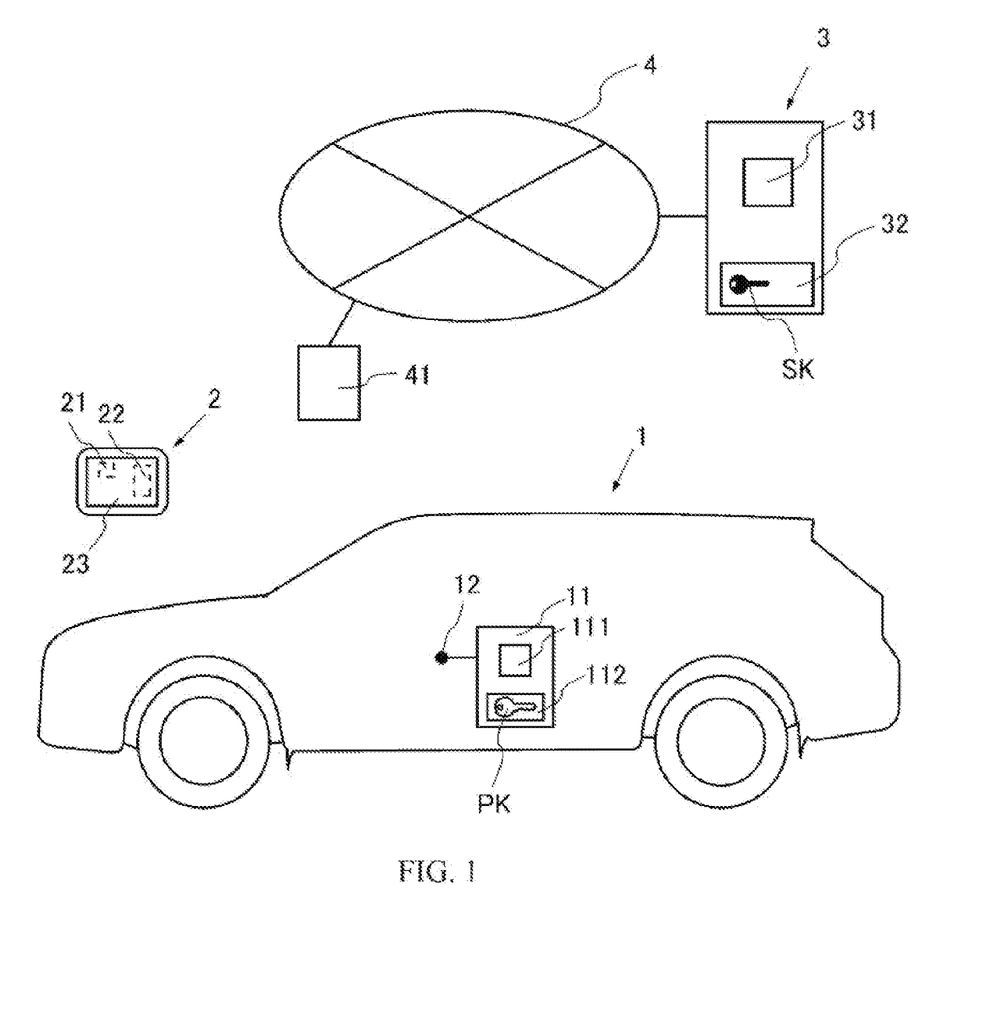
FIG. 1 is a diagram illustrating an access administration system according to one example embodiment of the disclosure.

In a first example embodiment of the disclosure, an ECU mounted on a vehicle may perform access administration to determine whether to perform a specific work requested by a request message. The request message may be information to request the ECU to perform a specific work. FIG. 1 illustrates an access administration system according to the first example embodiment. An ECU 11 mounted on a vehicle 1 may include a control processor 111 and a memory 112. The memory 112 may store a public key PK. The ECU 11 may include one or multiple ECUs. The ECU 11 may be coupled to an external device such as a vehicle maintenance apparatus 2 via a connector 12. The vehicle maintenance apparatus 2 may be used in a vehicle maintenance factory. The vehicle maintenance apparatus 2 may be a communication apparatus having a communication function, and may serve as a malfunction diagnosis apparatus and an adjustment apparatus, for example. The vehicle maintenance apparatus 2 may be used when the malfunction diagnosis is performed offboard, and when the malfunction diagnosis is performed onboard, the vehicle maintenance apparatus 2 may be used to output the results of the onboard diagnosis. The vehicle maintenance apparatus 2 may be couplable to the ECU 11 of the vehicle 1 via the connector 12, and may be couplable to an administration server 3 via a coupling apparatus 41 and a network 4 (e.g., the Internet). The administration server 3 may include a control processor 31 and a memory 32. The memory 32 may store a secret key SK.

In the first example embodiment, the vehicle maintenance apparatus 2 may be a dedicated tablet terminal in which dedicated software is mounted. The vehicle maintenance apparatus 2 may include a control processor 21, a memory 22, and a display 23 having a touch panel function. The display 23 may serve as a display device and an input device. An operator who performs vehicle maintenance may couple the vehicle maintenance apparatus 2 to the ECU 11 to perform diagnosis and adjustment of the vehicle 1. The operator may use the vehicle maintenance apparatus 2 also to update the ECU 11 via the vehicle maintenance apparatus 2 by downloading update data from the administration server 3.

The access administration system may perform the access administration by setting an available work list of permitted specific works in the ECU 11. The specific works in the available work list may be performed by the ECU 11. Examples of the specific work may include a process of transmitting engine data, such as the number of revolutions of an engine, from the ECU 11 to the vehicle maintenance apparatus 2.

Figure 2:
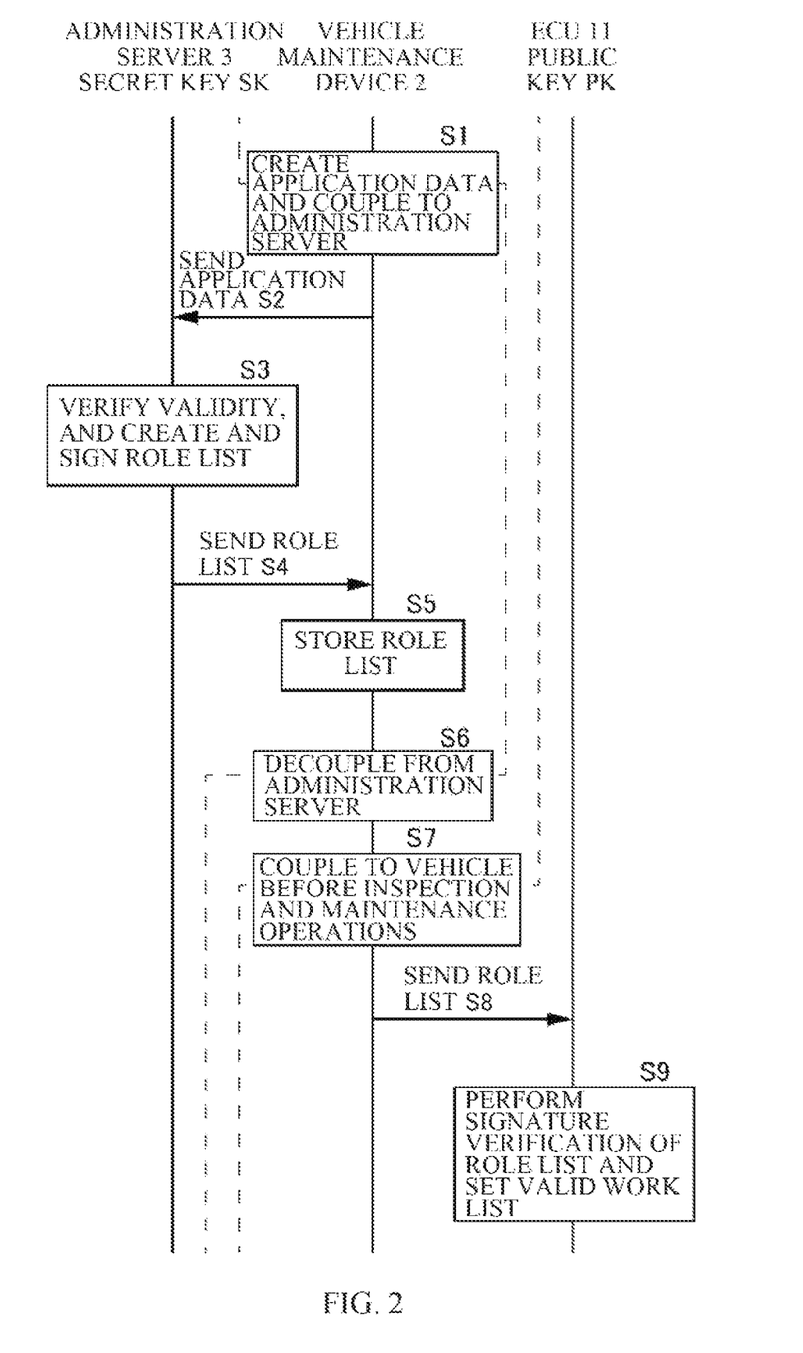
FIG. 2 is a flowchart of a process of setting an available work list according to one example embodiment of the disclosure.

Next, a description is given, with reference to a flowchart illustrated in FIG. 2, for example, of workings of the access administration system according to the first example embodiment upon access administration in a vehicle maintenance factory. In the vehicle maintenance factory, data on an application for use (hereinafter referred to as application data) may be created by operating the touch panel of the display 23 of the vehicle maintenance apparatus 2 which is a tablet terminal. At this time, a target vehicle number assigned to the ECU 11 of the vehicle 1 to be subjected to inspection and maintenance may be inputted using the display 23. Alternatively, the target vehicle number may be acquired from the ECU 11 by operating the touch panel of the display 23 while the vehicle maintenance apparatus 2 is coupled to the connector 12 of the vehicle to be subjected to the inspection and maintenance.

Figure 3:
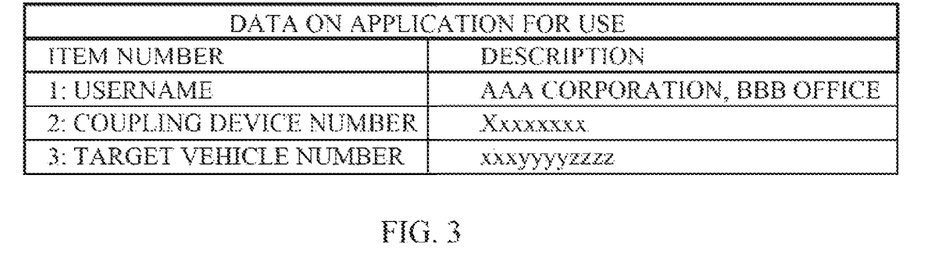
FIG. 3 is a table illustrating data on an application for use according to one example embodiment of the disclosure.

When the target vehicle number that is target vehicle information is inputted, an application data generator in the vehicle maintenance apparatus 2 may create the application data in which user information and the inputted target vehicle information are associated with each other. The user information may include a username stored in the memory 22 and a coupled device number specific to the vehicle maintenance apparatus 2. The application data generator may include the control processor 21 that is a computer configuration of the vehicle maintenance apparatus 2, and the memory 22 that stores a program for creating the application data. FIG. 3 illustrates an example of the application data created in the vehicle maintenance factory. The example of the application data illustrated in FIG. 3 is applicable to second and third example embodiments described below. The application data may include the username, the coupled device number, and the target vehicle number. Note that, in FIG. 3, the username, the coupled device number, and the target vehicle number are descriptions of respective item numbers 1 to 3 serving as headers of these data items. In FIG. 3, the item number 1 corresponds to "AAA corporation, BBB office", and the item number 2 corresponds to "Xxxxxxxx". The username represented as the item number 1 may be the name of a business office that administrates the vehicle maintenance apparatus 2, and may be set to the memory 22 after the vehicle maintenance apparatus 2 is delivered to the vehicle maintenance factory, for example. The coupled device number may be set to the memory 22 in a process of manufacturing the vehicle maintenance apparatus 2.

Figure 4:
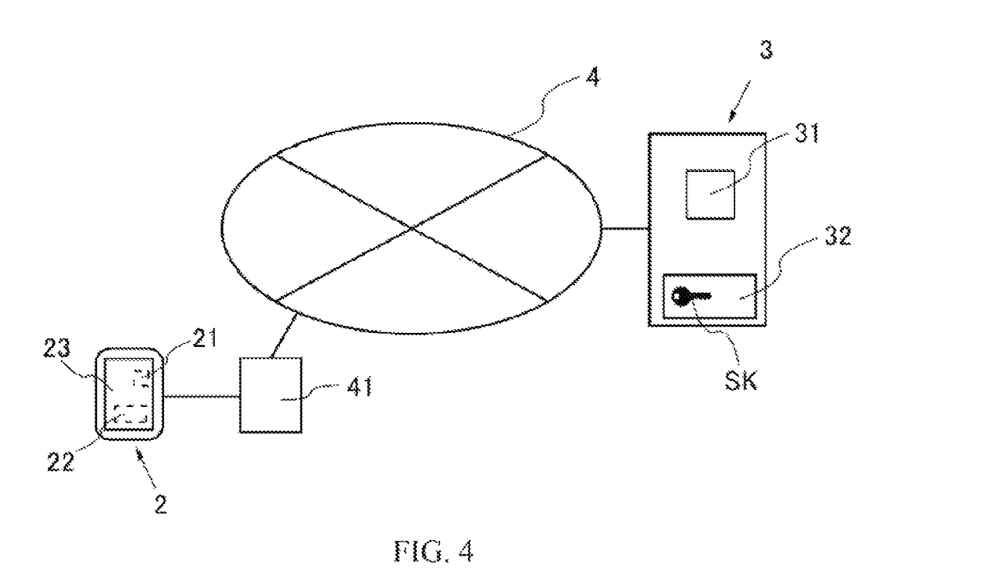
FIG. 4 is a diagram illustrating coupling of a vehicle maintenance apparatus to an administration server according to one example embodiment of the disclosure.

After the application data is created by the application data generator based on the inputted target vehicle information, the vehicle maintenance apparatus 2 may be coupled to the coupling apparatus 41 and thereby coupled to the administration server 3 via the network 4 (Step S1), as illustrated in FIG. 4. The coupling may be wired connection or wireless connection using WiFi, for example. The network 4 may be the Internet or another network using a dedicated line, for example. Note that the input of the target vehicle information and the creation of the application data may be performed while the vehicle maintenance apparatus 2 is coupled to the administration server 3. The vehicle maintenance apparatus 2 may transmit the application data to the administration server 3 via the coupling apparatus 41 and the network 4 (Step S2).

Figure 5:
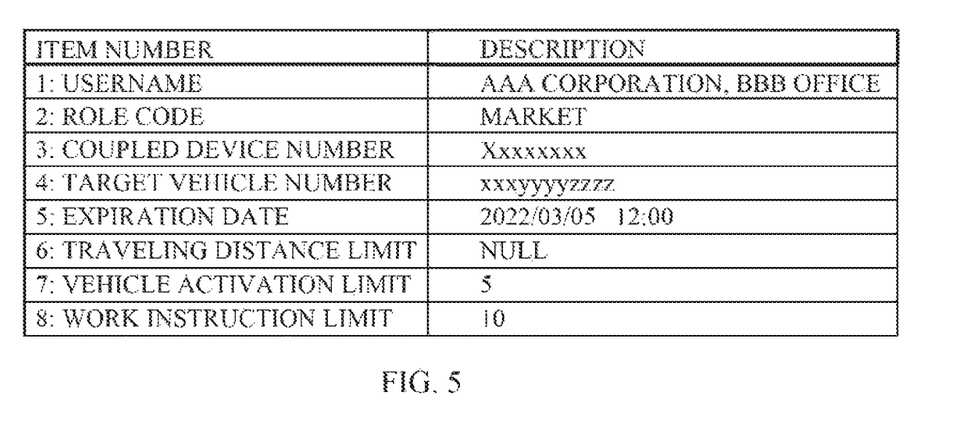
FIG. 5 is a role list according to one example embodiment of the disclosure.

The administration server 3 may verify validity of the application data, and may store the application data in the memory 32 when the validity of the application data is verified. When receiving invalid application data, the administration server 3 may refrain from storing the application data and send the vehicle maintenance apparatus 2 a refusal of receipt. The validity of the application data may be verified based on administration information regarding the vehicle maintenance apparatus 2 stored in the memory 32, such as the information on the correspondence between the username and the coupled device number sent as the application data, and a password received from the vehicle maintenance apparatus 2 upon the coupling, for example. The control processor 31 may create a role list based on the valid application data stored in the memory 32, and may sign the role list using the secret key SK (Step S3). The role list may be a list to permit the ECU 11 to execute a specific work. FIG. 5 illustrates an example of the role list. As in the application data, the username, a role code, and other data names in the role list are descriptions of respective item numbers 1 to 8 serving as headers of these data items. In FIG. 5, the item number 1 corresponds to "AAA corporation, BBB office", and the item number 2 corresponds to "Market", for example.

The term "role code" used herein may refer to a code that defines a specific work permitted to be executed. The role code to be used to create the role list in Step S3 may be determined by checking the received coupled device number against the correspondence list stored in the memory 32 of the administration server 3. In the first example embodiment, the coupled device number of the vehicle maintenance apparatus 2 having sent the application data may be registered in association with "Market" in the correspondence list stored in the memory 32 of the administration server 3. Based on the coupled device number in the application data, the administration server 3 may create the role list illustrated in FIG. 5 with setting the role code of the item number 2 as "Market".

In the role list illustrated in FIG. 5, the username of the item number 1 corresponds to "AAA corporation, BBB office", the role code of the item number 2 corresponds to "Market", and the coupled device number of the item number 3 and the target vehicle number of the item number 4 correspond to respective numbers sent as the application data to the administration server 3. An item number 5 may represent an expiration date of the role list. After the expiration date, the ECU 11 may refrain from accepting the request message requesting the specific work corresponding to the role code in the role list. An item number 6 may represent a traveling distance limit, an item number 7 may represent a vehicle activation limit, and an item number 8 may represent a work instruction limit. When any of the traveling distance, the number of vehicle activation times, and the number of specific work instructions becomes greater than the corresponding limit value after the creation and setting of the role list, the ECU 11 may refrain from accepting the request message requesting the specific work.

In the role list illustrated in FIG. 5, the role code represented by the item number 2 may be set as "Market" so that a specific work for vehicle maintenance is enabled. In this way, the specific works permitted to be executed by the ECU 11 may be determined based on the role code. The coupled device number of the item number 3 may be a number assigned to a device to be coupled to the vehicle 1 when the permitted specific work is set in the ECU 11, and may also be a number assigned to a device to be coupled to the vehicle 1 when the specific work is executed. In the first example embodiment, the coupled device number may be the number assigned to the vehicle maintenance apparatus 2. Other vehicle maintenance apparatuses assigned with different coupled device numbers may be prohibited from setting the specific work, and may be prohibited from causing the ECU 11 to execute the set specific work. The target vehicle number of the item number 4 may be a number assigned to the vehicle 1 in which the ECU 11 configured to execute the specific work is mounted. The target vehicle number may be stored in the memory 112 of the ECU 11. Other ECUs assigned with different target vehicle numbers may be prohibited from executing the specific work.

The item numbers 5 to 8 may correspond to limit values indicating respective validity periods. The specific work may be permitted to be executed when all the parameters are less than or equal to the respective limit values. When any of the parameters exceeds the corresponding limited value, the specific work may become no longer available. The expiration date of the item number 5 may be a deadline by which the specific work is able to be executed. After the expiration date, the specific work may become no longer available. If the vehicle 1 has traveled in a distance longer than the traveling distance limit of the item number 6 after setting of the specific work to the ECU 11, the specific work may become no longer available. If the vehicle 1 has been activated multiple times more than the vehicle activation limit of the item number 7 after the setting of the specific work to the ECU 11, the specific work may become no longer available. If the instruction about the specific work has been issued multiple times more than the work instruction limit after the setting the specific work to the ECU 11, the specific work may become no longer available.

As illustrated in FIG. 2, the role list signed using the secret key SK in Step S3 may be sent from the administration server 3 via the network 4 to the vehicle maintenance apparatus 2 coupled to the coupling apparatus 41 (Step S4). If the coupled device number stored in the memory 22 matches with the item number 3, the vehicle maintenance apparatus 2 may store the role list received from the administration server 3 in the memory 22 (Step S5). If the coupled device number stored in the memory 22 differs from the item number 3, the vehicle maintenance apparatus 2 may refrain from storing the role list sent from the administration server 3 in the memory 22, cause the display 23 to display a notification of inappropriate reception, and end the process.

After confirming the matching between the coupled device number and the item number 3 and storing the role list, the vehicle maintenance apparatus 2 may be decoupled from the administration server 3 (Step S6) and thus separated from the coupling apparatus 41. Thereafter, before the start of the inspection and maintenance operations, the vehicle maintenance apparatus 2 may be coupled to the ECU 11 of the vehicle 1 via the connector 12 (Step S7). When being coupled to the ECU 11, the vehicle maintenance apparatus 2 may send the role list to the ECU 11 (Step S8). The vehicle maintenance apparatus 2 may serve as a communication apparatus that sends the role list received from the administration server 3 to the ECU 11.

If the target vehicle number stored in the memory 112 differs from the vehicle number of the item number 4, the ECU 11 may cause the vehicle maintenance apparatus 2 to display a notification of inappropriate reception, and end the process. If the target vehicle number matches with the vehicle number of the item number 4, the ECU 11 may perform signature verification of the role list using the public key PK stored in the memory 112. If the role list is verified by the signature verification, the ECU 11 may set the available work list indicating the permitted specific works (Step S9). If the role list is not verified by the signature verification, the ECU 11 may cause the vehicle maintenance apparatus 2 to display a notification of inappropriate reception, and end the process. The permitted specific work may be executed upon reception of an acceptable request message. Even if a request message requesting an unpermitted specific work is received, the request message is not acceptable, and the specific work requested by the unacceptable request message is not executed.

Figure 6:
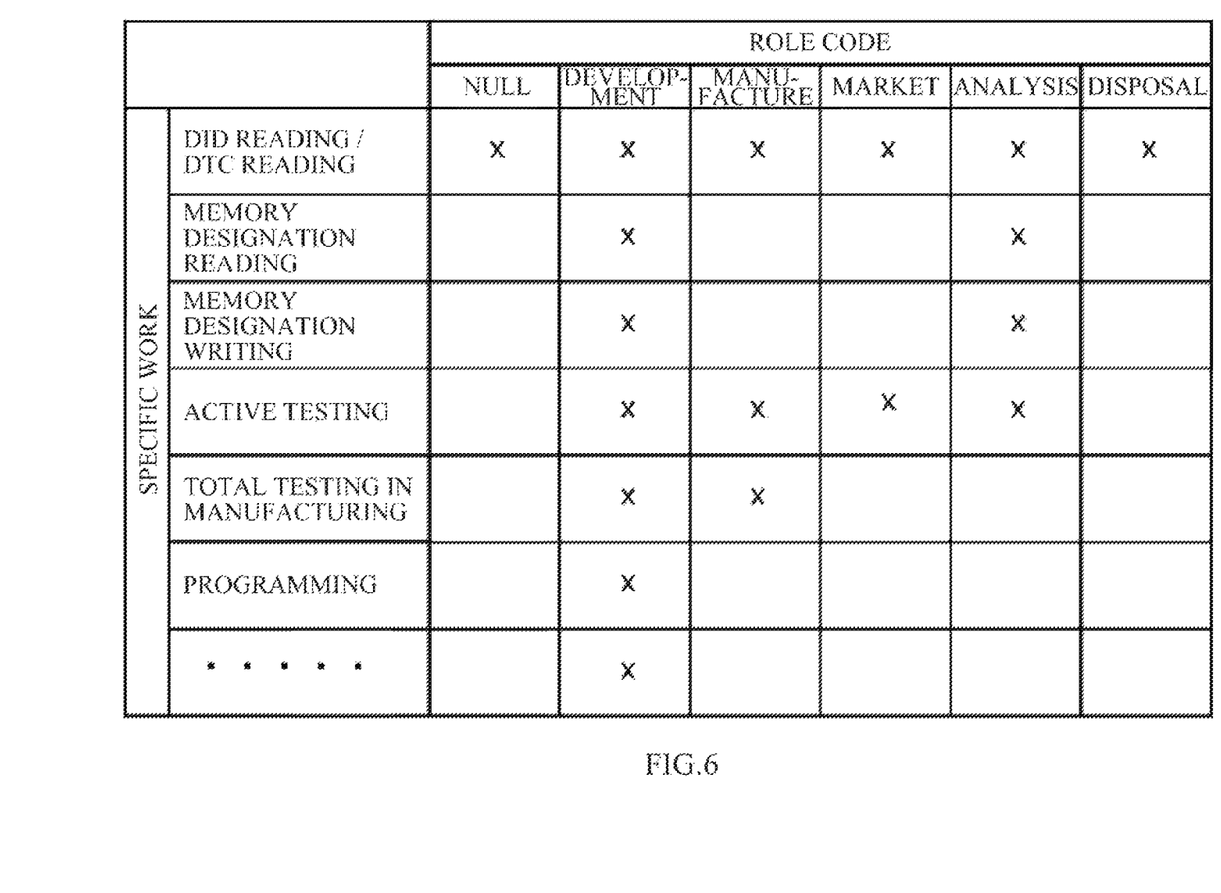
FIG. 6 is a correspondence table between role codes and specific works according to one example embodiment.

FIG. 6 illustrates examples of the specific works set corresponding to respective role codes. Examples of the specific works may include DID reading and DTC reading (indicated as "DID reading/DTC reading" in FIG. 6), memory designation reading, memory designation writing, active testing, total testing in manufacturing, and programming, for example. In the DID reading and DTC reading, the data stored in the memory 112 may be read using a preset functional address. The DTC reading may be reading of the results of the onboard diagnosis. In the memory designation reading, the data stored in the memory 112 may be read by specifying a physical address. In the memory designation writing, writing to the memory 112 may be performed by specifying a physical address. The active testing may be a test to be performed while an apparatus such as the engine of the vehicle 1 is actually driven. The total testing in manufacturing may be a test to be performed while the vehicle 1 is manufactured and before the vehicle 1 is shipped. The programming may be a specific work for rewriting a program stored in the memory 112 of the ECU 11. Descriptions of specific works other than those described above are omitted herein.

When the role code is "Market", the DID reading/DTC reading and the active testing may be set as the specific works in the memory 112. This may allow the vehicle maintenance apparatus 2 to cause the ECU 11 to perform the DID reading/DTC reading and the active testing as the specific works. However, the memory designation reading and the memory designation writing that involve specifying a physical address may not be set as the specific works. If the memory designation reading is set as the specific work and executed when the role code is "Market", confidential information such as a cryptographic key, a password, or private information can be stolen. If the memory designation writing is set as the specific work and executed when the role code is "Market", the data in the memory can be manipulated, resulting in an unintended operation. Thus, the memory designation reading and the memory designation writing may not be set as the specific works when the role code is "Market". In addition, the total testing in manufacturing and the programming may not be set as the specific works when the role code is "Market" because these operations are irrelevant to the vehicle maintenance.

When the role code is "Development" indicating development by the manufacturer, all of the specific works may be permitted. When the role code is "Manufacture" indicating manufacturing by the manufacturer, the total testing in manufacturing may be permitted in addition to the specific works permitted when the role code is "Market". When the role code is "Analysis" indicating malfunction analysis of the vehicle 1 by the manufacturer, the memory designation reading and the memory designation writing may be permitted in addition to the specific works permitted when the role code is "Market". Because "Analysis" is a role code dedicated to the manufacturer, the confidential information is protected from being stolen while the memory designation reading is executed, and no unintended operation is caused while the memory designation writing is executed. The total testing in manufacturing and the programming may not be set as permitted specific works when the role code is "Analysis" because these works are irrelevant to the analysis. When the role code is "Disposal" or when no role code is specified ("Null" in FIG. 6), the DID reading/DTC reading may be set as a permitted specific work.

According to the first example embodiment, because the role code in the role list is "Market" as illustrated in FIG. 5, the DID reading/DTC reading and the active testing may be specific works permitted in the available work list. That is, the DID reading/DTC reading and the active testing may be stored as permitted specific works in the available work list. As described above, specific works permitted to be executed may be determined based the on role codes, the available work list of the permitted specific works corresponding to the received role code may be set in the ECU 11.

Item numbers subsequent to the item number 5 illustrated in FIG. 5 may be also stored in the memory 112. In FIG. 5, the expiration date of the item number 5 is set as "2022/03/05 12:00". The specific work may not be permitted after the period. In FIG. 5, the traveling distance limit of the item number 6 is set as null, which means that no limitation is set in terms of a traveling distance. When the item number 6 is set as "10 km", the specific work corresponding to the role code may be kept permitted until the vehicle 1 travels ten kilometers after the reception of the role list at the ECU 11. The work instruction limit of the item number 8 may be a limit value of the number of specific work instructions. For example, when an instruction for engine data transmission is issued, the number of specific work instructions may be counted as "1". An instruction for another specific work may be also counted as "1". The expiration date, the traveling distance limit, the vehicle activation limit, and the work instruction limit may be limit values that indicate validity periods.

Figure 7:
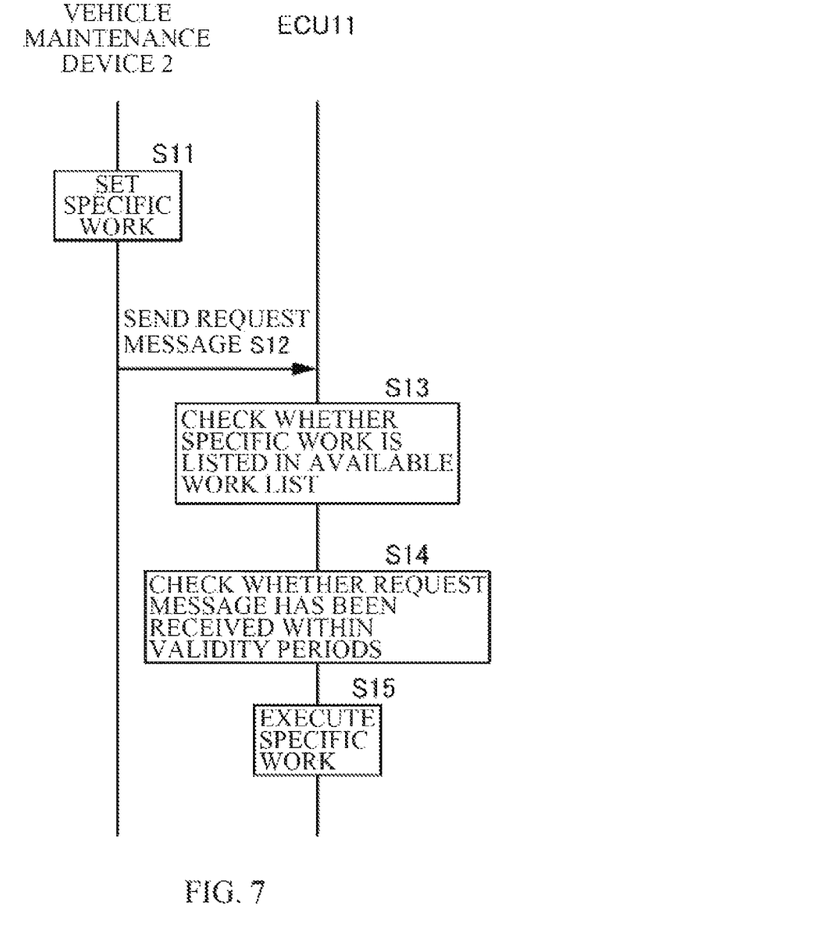
FIG. 7 is a flowchart of a process of executing a specific work according to one example embodiment.
Figure 8:
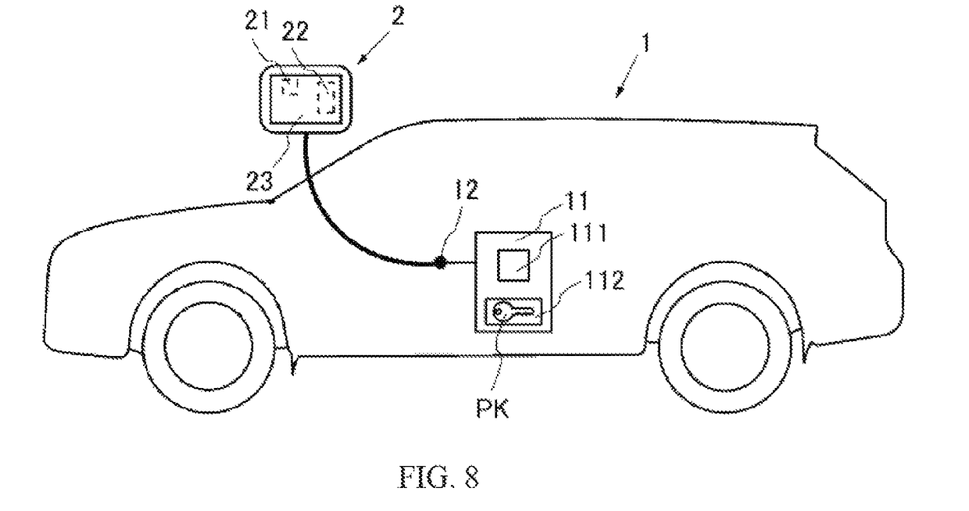
FIG. 8 is a diagram illustrating coupling of the vehicle maintenance apparatus to an ECU according to one example embodiment.

Next, workings of the vehicle maintenance apparatus 2 and the ECU 11 performed when the vehicle maintenance apparatus 2 causes the ECU 11 to execute a specific work are described with reference to the flowchart illustrated in FIG. 7. In this example, the engine data transmission may be executed as the specific work. As illustrated in FIG. 8, an operator who performs the vehicle maintenance may couple the vehicle maintenance apparatus 2 to the ECU 11 of the vehicle 1. Thereafter, the operator may input an instruction to execute the engine data transmission using the vehicle maintenance apparatus 2, to thereby set the engine data transmission as the specific work (Step S11). The engine data transmission may be a specific work involving DID reading of the engine data, which corresponds to the DID reading/DTC reading in FIG. 6. After the specific work is set, the vehicle maintenance apparatus 2 may send the ECU 11 a request message requesting to execute multiple processes of the engine data transmission (Step S12).

The ECU 11 may check whether the engine data transmission which is a specific work requested by the received request message is listed in the available work list corresponding to the coupled device number of the vehicle maintenance apparatus 2 (Step S13). In this example, the engine data transmission may correspond to the DID reading/DTC reading listed as a permitted specific work in the available work list stored in the memory 112. Thus, it is determined in Step S13 that the engine data transmission is listed as the specific work in the available work list and is thus available. The ECU 11 may further check whether the request message has been received within the validity periods (Step S14). If the request message has been received within a validity period before the limit value "2022/03/05 12:00" set as the item number 5 in FIG. 5, it may be determined that the specific work is available. The ECU 11 may further check whether the request message has been received within the validity periods that are the limit values set as the item numbers 6 and 7. As the item number 6 is set as null in FIG. 5, no traveling distance limit has been set. If the number of activation times of the vehicle 1 becomes greater than 5 set as the vehicle activation limit of the item number 7 after the specific work is set in the available work list in the ECU 11, the specific work may become no longer available. If the number of specific work instructions becomes greater than 10 set as the work instruction limit of the item number 8 after the specific work is set in the available work list in the ECU 11, the specific work may become no longer available.

Note that Step S13 and Step S14 may be performed in reverse order. The validity periods to be used in Step S14 may be determined based on the role list illustrated in FIG. 5. Based on the content of the role list, the expiration date, the vehicle activation limit, or multiple limit values including these limits may be checked in Step S14.

If it is determined in Step S13 that the request message requesting the engine data transmission is acceptable based on the available work list and if it is determined in Step S14 that the request message has been received within all of the validity periods specified by the limit values, the ECU 11 may execute the specific work by sending the engine data to the vehicle maintenance apparatus 2 (Step S15). In this way, when receiving the request message requesting a specific work listed as a permitted specific work in the available work list within the validity periods, the ECU 11 may execute the requested specific work. In contrast, when receiving the request message requesting a specific work not listed as a permitted specific work in the available work list or when receiving the request message after the validity periods, the ECU 11 may refrain from executing the requested specific work. For example, when receiving the request message requesting the memory designation reading with specifying a specific address, the ECU 11 may refrain from executing the requested specific work. When refraining from executing the specific work requested by the request message, the ECU 11 may send an inexecution response message.

Note that the ECU 11 according to the first example embodiment may be multiple ECUs or may be an integrated ECU in which some or all of the multiple ECUs are integrated. When the ECU 11 is multiple ECUs, the available work list may be set for each of the ECUs.

Second Example Embodiment

Figure 9:
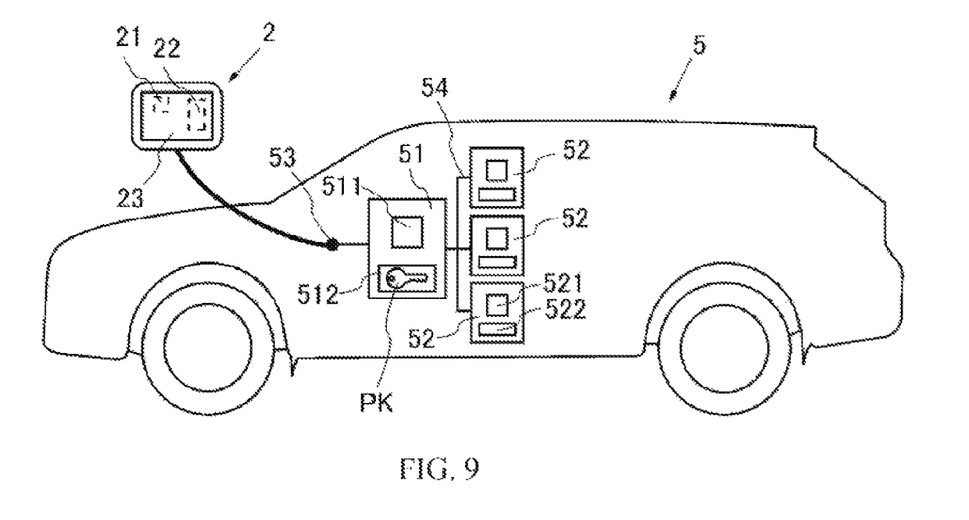
FIG. 9 is a diagram illustrating coupling of the vehicle maintenance apparatus to an ECU according to one example embodiment.

In second and third example embodiments, the ECU 11 described in the first example embodiment may be multiple ECUs. In the second example embodiment, as illustrated in FIG. 9, a vehicle 5 may include an access administration ECU 51 and multiple vehicle device ECUs 52. The access administration ECU 51 may be disposed between a connector 53 and the vehicle device ECUs 52. The access administration ECU 51 may include a control processor 511 and a memory 512. The memory 512 may store a public key PK. When receiving an acceptable request message via the connector 53, the access administration ECU 51 may serve as a gateway that transfers the request message to the vehicle device ECUs 52 via a communication line 54. When receiving an unacceptable request message, the access administration ECU 51 may refrain from transferring the request message to the vehicle device ECUs 52. The vehicle device ECUs 52 may each include a control processor 521 and a memory 522. The vehicle maintenance apparatus 2, which is a communication apparatus, may have a configuration similar to that described in the first example embodiment. In addition, the vehicle maintenance apparatus 2 may be coupled to the administration server 3 in a manner similar to that described in the first example embodiment with reference to FIG. 4.

Figure 10:
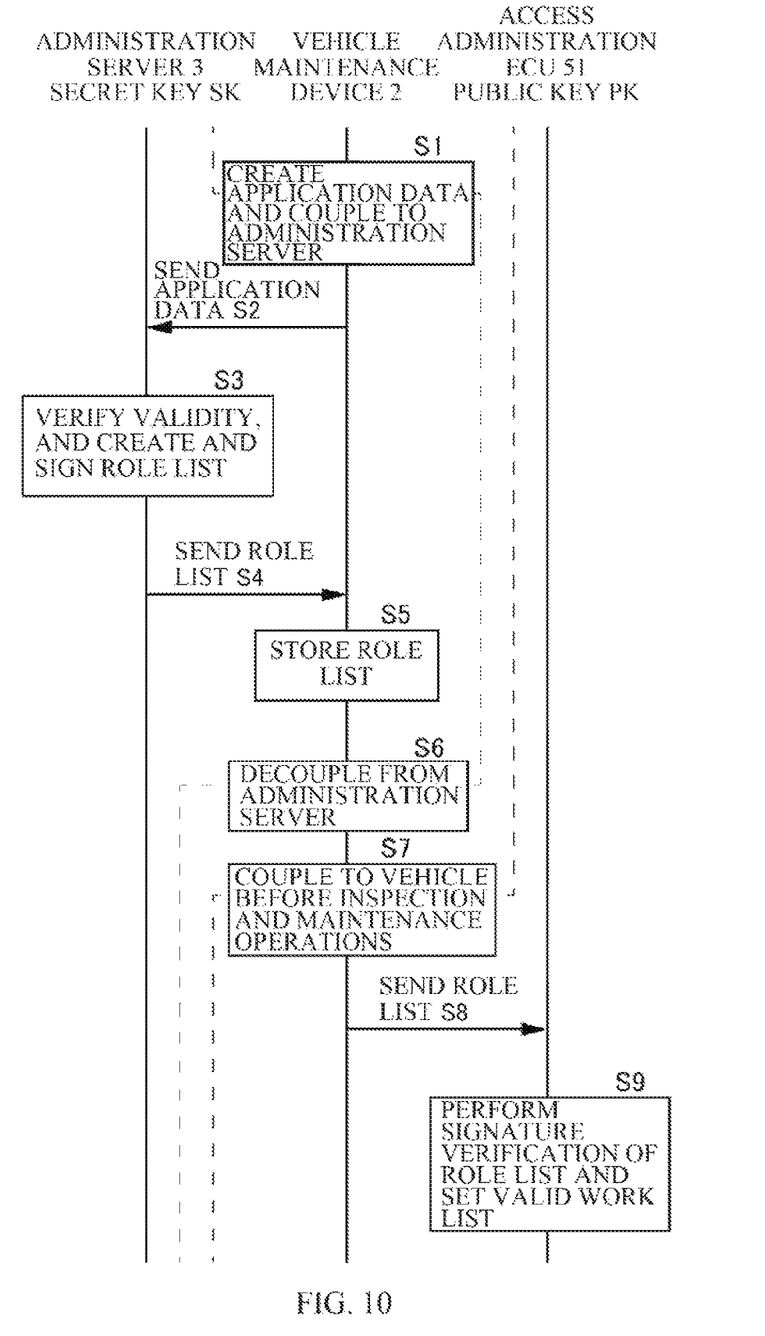
FIG. 10 is a flowchart of a process of setting an available work list according to one example embodiment.

A description is given, with reference to a flowchart in FIG. 10, of workings of the access administration system according to the second example embodiment in a vehicle maintenance factory. The flowchart in FIG. 10 illustrates a process of setting the available work list of the specific work permitted to be executed by the ECU in response to an acceptable request message. In the second example embodiment, the role list may be sent to the access administration ECU 51 in Step S8, and the access administration ECU 51 may perform signature verification of the role list and set the available work list in Step S9. The other steps may be similar to those in the first example embodiment illustrated in FIG. 2. The application data may be similar to that in the first example embodiment illustrated in FIG. 3, and the role list may be similar to that in the first example embodiment illustrated in FIG. 5. The vehicle maintenance apparatus 2 may be coupled to the administration server 3 as in a manner similar to that described in the first example embodiment with reference to FIG. 4, and the correspondence between the role codes and the respective specific work may be similar to that in described in the first example embodiment with reference to FIG. 6. In the second example embodiment, the role list may be sent from the vehicle maintenance apparatus 2 to the access administration ECU 51 in Step S8 without transmitting through the communication line 54 that couples the ECUs to each other.

Figure 11:
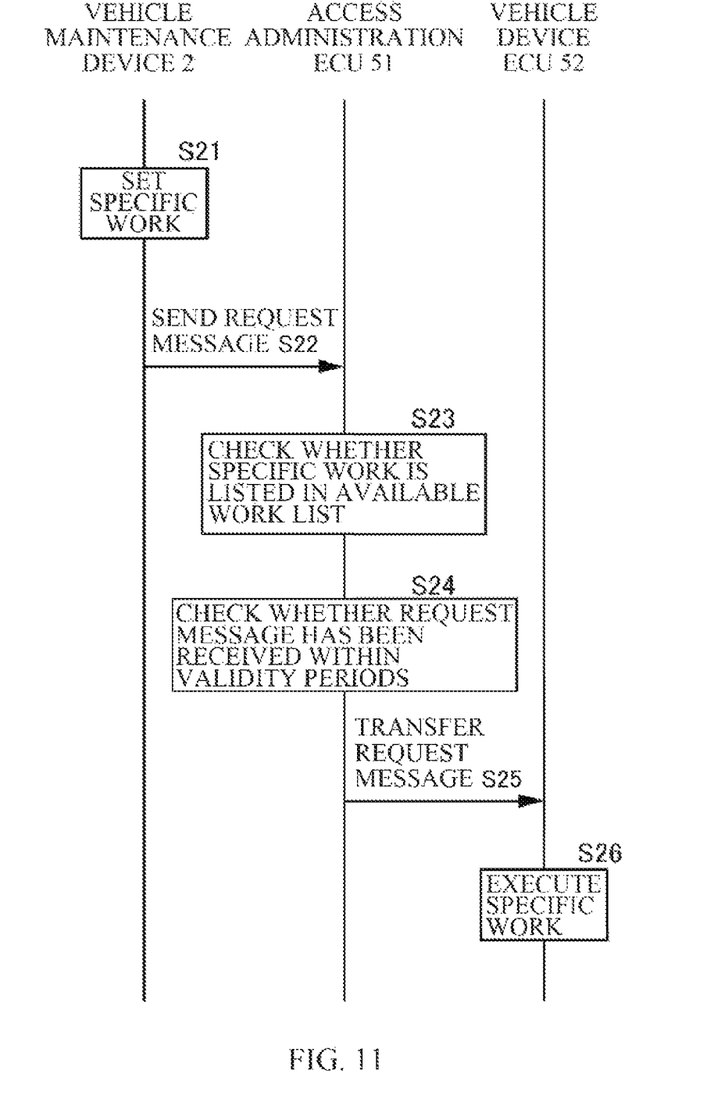
FIG. 11 is a flowchart of a process of setting a specific work according to one example embodiment.

A description is given, with reference to a flowchart illustrated in FIG. 11, of workings of the vehicle maintenance apparatus 2, the access administration ECU 51, and the vehicle device ECUs 52 according to the second example embodiment. The flowchart in FIG. 11 illustrates a process of causing the vehicle device ECUs 52 to perform a specific work by the vehicle maintenance apparatus 2. As illustrated in FIG. 9, the operator who performs the vehicle maintenance may couple the vehicle maintenance apparatus 2 to the connector 53 of the vehicle 5. The vehicle maintenance apparatus 2 may be thereby coupled to the access administration ECU 51. The coupling may not involve the communication line 54. Thereafter, the operator may input, for example, an instruction to execute the engine data transmission to the vehicle maintenance apparatus 2, to thereby set the engine data transmission as the specific work (Step S21). This may cause the vehicle maintenance apparatus 2 to send the access administration ECU 51 a request message requesting the vehicle device ECUs 52 to send multiple pieces of the engine data (Step S22).

The access administration ECU 51 may check whether the specific work requested by the request message is listed in the available work list corresponding to the coupled device number of the vehicle maintenance apparatus 2 (Step S23), and may further check whether the request message has been received within the validity periods (Step S24). If it is determined in Step S23 that the request message is acceptable based on the available work list and if it is determined in Step S24 that the request message has been received within the validity periods, the access administration ECU 51 may accept the request message and transfer the request message to the vehicle device ECUs 52 via the communication line 54 (Step S25). That is, when receiving the request message requesting the specific work listed as a permitted specific work in the available work list within the validity periods, the access administration ECU 51 may execute the requested specific work. In contrast, when receiving an unacceptable request message or when receiving a request message after the validity periods, the access administration ECU 51 may refrain from sending an instruction for the specific work to the vehicle device ECUs 52. When receiving the request message, the vehicle device ECUs 52 may execute the specific work by sending the engine data to the vehicle maintenance apparatus 2 via the access administration ECU 51 (Step S26). According to the second example embodiment described above, the access administration ECU 51 may accept the request message requesting the specific work permitted in the available work list, and send the request message to the vehicle device ECUs 52. The access administration ECU 51 may thus serve as a gateway.

Third Example Embodiment

Figure 12:
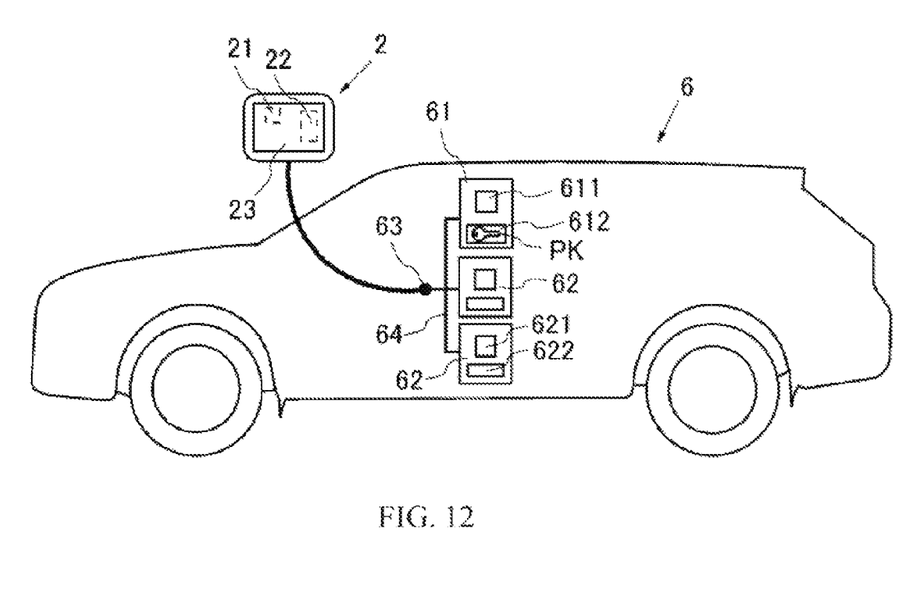
FIG. 12 is a diagram illustrating coupling of the vehicle maintenance apparatus to an ECU according to one example embodiment.

In the third example embodiment, as illustrated in FIG. 12, a connector 63 may be coupled to a communication line 64 using a serial communication protocol. The role list may be sent from the vehicle maintenance apparatus 2 via the connector 63 and the communication line 64 in the vehicle 6 to the access administration ECU 61. The access administration ECU 61 may include a control processor 611 and a memory 612. The access administration ECU 61 may perform signature verification of the role list using a public key stored in the memory 612, and send the role list verified by the signature verification to all of vehicle device ECUs 62 relevant to the role list. In each of the vehicle device ECUs 62 relevant to the access administration of the specific work, a control processor 621 may cause a memory 622 to store the available work list of the specific work.

When the specific work is to be performed, the request message may be sent from the vehicle maintenance apparatus 2 via the connector 63 to the communication line 64. The request message may be received by the vehicle device ECUs 62 relevant to the specific work via the communication line 64. When receiving the request message, each of the vehicle device ECUs 62 may check whether the request message has been received within the validity periods. If the request message has been received within the validity periods, the vehicle device ECU 62 may execute the specific work using the control processor 621 and the memory 622, and send a response message to the communication line 64. The response message may be sent to the vehicle maintenance apparatus 2 via the connector 63.

In the flow of a process of setting the available work list according to the third example embodiment, the available work list may be set in Step S9 by the vehicle device ECUs 62 relevant to the specific work, unlike the second example embodiment described with reference to FIG. 10. In the flow of a process of executing the specific work according to the third example embodiment, the request message may be sent in Step S22 to the vehicle device ECUs 62, unlike the second example embodiment described with reference to FIG. 11. Further, in the third example embodiment, the vehicle device ECUs 62 may each check in Step S23 whether the specific work is listed in the available work list and check in Step S24 whether the request message has been received within the validity periods. In the third example embodiment, transferring the request message in Step S25 may not be performed. The specific work may be executed in Step S26 by the vehicle device ECUs 62. The application data may be similar to that descried in the first or second example embodiment with reference to FIG. 3, and the role list may be similar to that described in the first or second example embodiment with reference to FIG. 5. Further, the vehicle maintenance apparatus 2 may be coupled to the administration server 3 in a manner similar to that described in the first or second example embodiment with reference to FIG. 4, and the correspondence between the role codes and the respective specific works may be similar to that described in the first or second example embodiment with reference to FIG. 6.

In the third example embodiment, whether the specific work is listed in the available work list and whether the request message has been received within the validity periods may be checked by the vehicle device ECUs that execute the specific work. However, whether the specific work is listed in the available work list and whether the request message has been received within the validity periods may be checked by different ECUs. Further, in the second or third example embodiment, the data including the public key and the role list may be stored in a memory or an ECU other than the ECU that uses the data.

In the first to third example embodiments, the vehicle maintenance apparatus used for the vehicle maintenance may be employed as the communication apparatus; however, for use by a manufacturer, for example, a device suitable for the use by the manufacturer may be used as the communication apparatus. Examples of the device may include a laptop personal computer and a desktop personal computer installed with software dedicated to the manufacturer. The vehicle maintenance apparatus or the device may serve as the communication apparatus that transfers the role list from the administration server to the ECU. The vehicle maintenance apparatus or the device may be an information device, such as a laptop computer or a desktop computer, other than the tablet terminal. In the first to third example embodiments, creating and sending the application data, transferring the role list, setting the specific work, and sending the request message may be performed by the single vehicle maintenance apparatus; however, these operations may be performed by different apparatuses. The role list may be sent directly from the vehicle maintenance apparatus or the administration server to the vehicle via a network using a radio communication apparatus mounted on the vehicle. The role list may be created in the administration server 3 and sent from the administration server 3 without creating the application data.

In the first to third example embodiments, the role code may be set by the administration server 3 based on the coupled device number. Alternatively, the role code may be set as follows: A role may be inputted using the vehicle maintenance apparatus 2 and sent together with the application data to the administration server. Thereafter, the rode code may be set by the administration server based on the role. Further, in the first to third example embodiments, one or more specific works may be set in the available work list. Alternatively, a role code collectively indicating one or more specific works may be stored in the available work list. For example, when the request message requesting a specific work is received, a determination may be made as to whether the specific work corresponds to a permitted specific work based on the role code stored in the available work list, and the process of the specific work may be executed if the specific work is determined to correspond to a permitted specific work. In this case, the specific work to be executed may be determined based on the role code. Thus, the ECU, the access administration ECU, or the vehicle device ECU may determine whether the specific work corresponds to a permitted specific work based on the role code stored in the available work list, and execute the specific work if the specific work is determined to correspond to a permitted specific work.

The foregoing example embodiments are non-limiting, and various modifications in design may be made without departing from the gist of the disclosure. Further, the technologies in the foregoing example embodiments may be combined with each other as long as there are no particular contradictions or problems in their purposes or configurations.

According to the foregoing example embodiments, a specific work, such as diagnosis information transmission, may be permitted based on the role list verified by the signature verification using the public key. It is therefore possible to execute a specific work within a range appropriate for each operator.

The invention claimed is:

1. An electronic control unit to be applied to a vehicle, the electronic control unit comprising at least one electronic control unit configured to:
   store a public key;
   receive, from a communication apparatus, a digitally signed role list generated by an administration server, the role list including a role code associated with a plurality of specific works, each of the specific works corresponding to a vehicle control-related operation including diagnosis, memory access, testing, or reprogramming;
   verify a digital signature of the digitally signed role list using the stored public key;
   identify the plurality of specific works corresponding to the role code upon verifying the digital signature of the digitally signed role list;
   set, in an available work list, the identified specific works that are authorized to be executed by the at least one electronic control unit; and
   execute, upon receiving a request message requesting one of the specific works set in the available work list, a process corresponding to the requested specific work.

2. The electronic control unit according to claim 1, wherein the digitally signed role list includes a limit value indicating a validity period of the available work list.

3. The electronic control unit according to claim 2, wherein
   the at least one electronic control unit comprises an access administration electronic control unit and a vehicle device electronic control unit,
   the access administration electronic control unit is configured to
   store the public key,
   receive the digitally signed role list from the communication apparatus,
   perform the signature verification using the public key, and
   send the digitally signed role list verified by the signature verification to the vehicle device electronic control unit, and
   the vehicle device electronic control unit is configured to set the available work list based on the digitally signed role list, and
   execute, when receiving the request message requesting the specific work set in the available work list, the process of the specific work.

4. The electronic control unit according to claim 1, wherein
   the at least one electronic control unit comprises an access administration electronic control unit and a vehicle device electronic control unit,
   the access administration electronic control unit is configured to
   store the public key,
   receive the digitally signed role list from the communication apparatus,
   perform the signature verification using the public key, and
   send the digitally signed role list verified by the signature verification to the vehicle device electronic control unit, and
   the vehicle device electronic control unit is configured to set the available work list based on the digitally signed role list, and
   execute, when receiving the request message requesting the specific work set in the available work list, the process of the specific work.

5. The electronic control unit according to claim 1, wherein
   the at least one electronic control unit comprises an access administration electronic control unit and a vehicle device electronic control unit,
   the access administration electronic control unit is configured to
   store the public key,
   receive the digitally signed role list from the communication apparatus,
   perform the signature verification using the public key,
   set the available work list based on the digitally signed role list verified by the signature verification, and send, when receiving the request message requesting the specific work set in the available work list, the request message to the vehicle device electronic control unit, and the vehicle device electronic control unit is configured to execute, when receiving the request message requesting the specific work from the access administration electronic control unit, the process of the specific work.

6. A communication apparatus comprising a processor coupled to a memory, the processor being configured to:
   create data on an application for use in which user information and target vehicle information are associated with each other;
   send the data on the application for use to an administration server; and
   send a received digitally signed role list to at least one electronic control unit configured to set, based on the digitally signed role list verified by signature verification using a public key, an available work list indicating a specific work permitted to be executed, the digitally signed role list including a role code associated with a plurality of specific works, each of the specific works corresponding to a vehicle control-related operation including diagnosis, memory access, testing, or reprogramming.

7. The communication apparatus according to claim 6, wherein the communication apparatus comprises a vehicle maintenance apparatus configured to be coupled to a vehicle to perform malfunction diagnosis for maintenance of the vehicle.

8. An access administration system configured to control access to at least one electronic control unit mounted on a vehicle, the access administration system comprising:
   an administration server, comprising a processor coupled to a memory, configured to store a secret key;
   the at least one electronic control unit configured to store a public key; and
   a communication apparatus, comprising a processor coupled to a memory, configured to be coupled to the administration server and the at least one electronic control unit, wherein
   the administration server is configured to
      create a role list to set a specific work permitted to be executed by the at least one electronic control unit, and
      digitally sign the role list using the secret key,
   the communication apparatus is configured to send the digitally signed role list received from the administration server to the at least one electronic control unit, and
   the at least one electronic control unit is configured to
      receive the digitally signed role list from the communication apparatus, the digitally signed role list including a role code associated with a plurality of specific works, each of the specific works corresponding to a vehicle control-related operation including diagnosis, memory access, testing, or reprogramming,
      verify a digital signature of the digitally signed role list using the stored public key;
      identify the plurality of specific works corresponding to the role code upon verifying the digital signature of the digitally signed role list;
      set, in an available work list, the identified specific works that are authorized to be executed by the at least one electronic control unit; and
      execute, upon receiving a request message requesting the specific works set in the available work list, a process corresponding to the requested specific work.

9. The access administration system according to claim 8, wherein
   the digitally signed role list includes a role code collectively indicating multiple specific works,
   the specific works indicated by the role code are set in the available work list, and
   the at least one electronic control unit is configured to execute, when receiving a request message requesting one of the specific works as the specific work, a process of the specific work.

10. The access administration system according to claim 9, wherein
    the at least one electronic control unit comprises an access administration electronic control unit and a vehicle device electronic control unit,
    the access administration electronic control unit is configured to send, when receiving the request message requesting the specific work set in the available work list, the request message to the vehicle device electronic control unit, and
    the vehicle device electronic control unit is configured to execute, when receiving the request message requesting the specific work, the process of the specific work.

11. The access administration system according to claim 8, wherein
    the at least one electronic control unit comprises an access administration electronic control unit and a vehicle device electronic control unit,
    the access administration electronic control unit is configured to send, when receiving the request message requesting the specific work set in the available work list, the request message to the vehicle device electronic control unit, and
    the vehicle device electronic control unit is configured to execute, when receiving the request message requesting the specific work, the process of the specific work.

* * * * *